May 21, 1968

R. W. HUMMERT 3,383,766

CUTTER ASSEMBLAGE HAVING FOUR SELECTIVELY
USABLE SINGLE LIP CUTTERS

Filed Dec. 8, 1966

INVENTOR.
RUDOLF W. HUMMERT
BY
Meyer, Tilberry & Body

ATTORNEYS.

United States Patent Office 3,383,766
Patented May 21, 1968

3,383,766
CUTTER ASSEMBLAGE HAVING FOUR SELECTIVELY USABLE SINGLE LIP CUTTERS
Rudolf W. Hummert, Brecksville, Ohio, assignor to Falcon Tool Company, Inc., Cleveland, Ohio, a corporation of Ohio
Filed Dec. 8, 1966, Ser. No. 600,215
6 Claims. (Cl. 30—164.9)

This invention is directed to the cutting art and, more particularly, to an improved cutting tool construction and the method of making the tool.

A cutter formed in accordance with the present invention is especially useful in engraving and duplicating work and will be described with particular reference thereto; however, it is appreciated the cutter is capable of broader application and could be used in a variety of types of cutting operations.

In performing engraving and duplicating operations it is generally necessary to make a large variety of cuts of differing and unusual configurations. For this reason, it is normally not possible to buy cutters having the required configurations. Additionally, even if it is possible to purchase the shape needed for any particular cut, most shops find it economically prohibitive to purchase the cutters because of the relatively limited use they have for any particular shape. Because of this, most shops have made it a practice to buy cutter blanks in the form of cylindrical pieces of tool steel or carbide and grind the cutter shape required for each differing cutting operation. This reduces the cutter inventory which the shop must carry and often effects a savings even in those instances when it is possible to purchase the cutter configuration required.

This procedure of forming each individual cutter needed from a cylindrical piece of tool steel or carbide is, however, rather time-consuming and costly. For example, in forming the normally used single lip type cutter it is first necessary to grind a flat surface parallel with the axis of the cylindrical blank from one end for a considerable distance therealong. Following this, the required cutter configuration must then be ground on the longitudinally extending edges of the flat. As can readily be seen, the time required to grind the necessary flat can be considerable. Additionally, from any one cylindrical blank it is possible to obtain only two cutters, i.e., one from each end. Because of the limited use generally made of any one particular cutter configuration, the expense involved in blanks alone can become considerable.

The present invention overcomes the above problems and provides a cutter apparatus and method of forming the same, which eliminates the necessity of grinding the required flats and permits four separate cutters to be obtained from the same amount of material previously used to obtain only two cutters.

In accordance with the present invention, a method of forming a single lip engraving cutter is provided. This method comprises taking a pair of cutter blanks, each having a longitudinal axis and at least one flat exterior surface extending generally parallel to the axis, and positioning the blanks with their flat surfaces in engagement throughout a substantial portion and with their longitudinal axes extending generally parallel. With the blanks thus positioned in contacting engagement, they are adjusted so that the end portion of one of the blanks is spaced outwardly from a corresponding end of the other blank. With the end portions thus spaced, the blanks are clamped together in a manner which permits the flat surface of the outwardly spaced blank to serve as a cutting flat.

In accordance with another aspect of the present invention, a cutting tool assemblage for use in engraving and duplicating is provided which includes a tool holder having a longitudinal axis about which it is adapted to be rotated, and a tool receiving opening formed in one end thereof. The opening is generally concentric with the axis and is provided with means for releasably securing a cutting tool therein. A pair of cutting tool forming blanks are positioned in this opening. Each of the blanks comprise an elongated hardened body having a longitudinal axis and a flat exterior surface extending parallel to the axis. The blanks are positioned in the opening in the tool holder with their flat exterior surfaces in engagement and their longitudinal axes extending parallel to the longitudinal axis of the holder. One of the blanks is positioned so as to extend further from the opening, whereby the flat surface of the outwardly extending blank constitutes a cutting flat.

By the use of a pair of cutting blanks positioned as described above, it is possible to obtain four separate cutting flats from one pair of cutting blanks. Note that by merely releasing the tool holder and sliding the blanks relative one another, two separate cutting flats are obtained. Additionally, by removing the blanks and inserting their opposite ends two more flats are obtained. As is apparent, this offers substantial savings both in grinding time and tool blank cost.

A primary object of the present invention is the provision of a method which substantially reduces the time and expense required in forming a single lip type cutter.

An additional object is the provision of a method of forming a single lip type cutter which permits more cutters to be obtained from the same amount of material than was previously possible.

A still further object of the provision of a cutter assemblage which permits four cutter flats to be obtained from an amount of material that previously yielded only two such flats.

Another object is the provision of a cutter assemblage which substantially reduces the time involved in making a single lip engraving cutter.

Yet another object is the provision of a cutter assemblage which eliminates the need for grinding flats when making a single lip-type cutter.

These and other objects and advantages will become apparent from the description used to illustrate the preferred embodiment of the invention when read in connection with the accompanying drawings in which.

Figure 1:
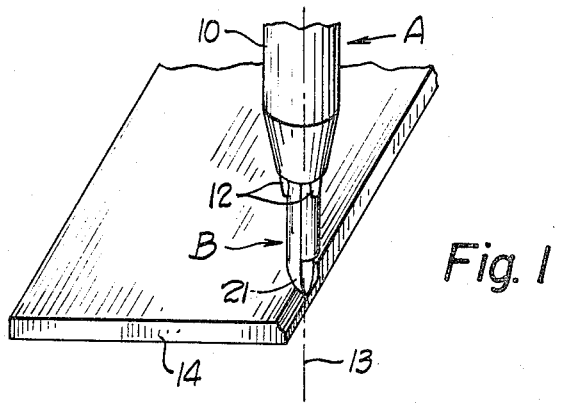
FIGURE 1 is a pictorial view of the cutter assemblage formed according to the present invention.
Figure 2:
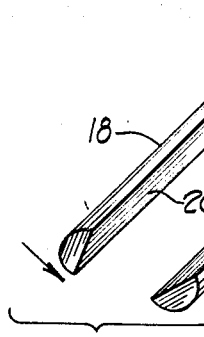
FIGURES 2 through 5 show the various steps performed in forming a cutter as shown in FIGURE 1.

Referring now to the drawings when showings are for the purpose of illustrating a preferred embodiment of the invention only and not for the purpose of limiting same:

FIGURE 1 shows the overall arrangement of a cutter assemblage formed according to the present invention and comprising a tool holder portion A and a cutter portion B.

Tool holder portion A could take a variety of forms, however, as shown in FIGURE 1 it comprises a conventional chuck 10 having releasable and adjustable holding jaws 12 adapted to firmly grip and hold cutter portion B. Means, not shown, would be provided to rotate holder A, and consequently, cutter portion B, about longitudinal axis 13 and move cutter portion B and work piece 14 relative one another to make the required cut.

Figures 6, 7, 8:
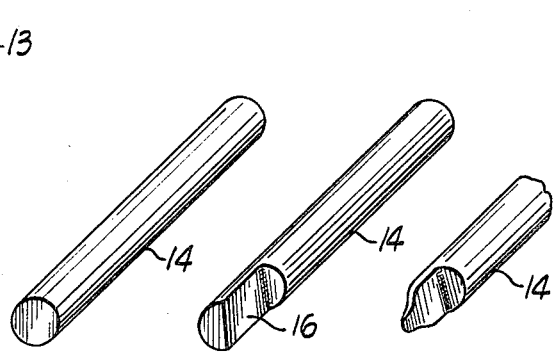
FIGURES 6 through 8 show a prior art method used for forming a single lip type cutter.

Of particular importance to the present invention is the arrangement of cutter portion B. As previously mentioned, in the past cutter portion B has been formed in the manner shown in FIGURES 6 through 8. Generally, this comprised taking a cylindrical carbide or tool steel cutter blank 14, as shown in FIGURE 6, and grinding away a substantial portion adjacent one end to form a cutter flat 16. After flat 16 had been formed, the required cutting edge configuration was then ground, as shown in FIGURE 7. As can be seen, the amount of material which must be ground away is substantial and considerable time is required for grinding the flat 16. Further, the use of carbide as the cutter material generally necessitated the use of diamond grinding wheels which, because of wearing away as the result of the large amount of grinding which must be performed, tended to become a considerable additional expense. Additionally, when cutters are formed according to this prior method, only two cutters can be formed from any one cylindrical cutter blank, that is, it is only possible to obtain one cutter flat at each end of the blank.

According to the present invention, cutter portion B is formed in a novel manner which overcomes the above-noted problems. As best shown in FIGURES 2 through 5, cutter portion B comprises two cutter blanks 18 having flat surfaces 20 extending parallel to their longitudinal axes. Although blanks 18 preferably have a semi-circular cross section they could, of course, have other cross-sectional shapes such as semi-hexagonal or semi-octagonal.

Figure 3:
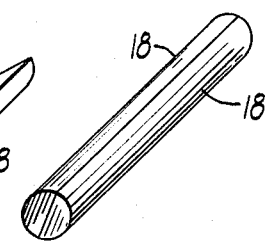
Figure 4:
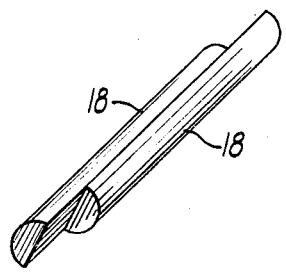
Figure 5:
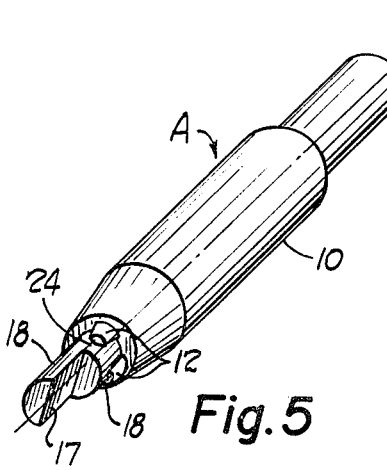

In order to make blanks 18 into a single lip cutter, they are placed with their flat surfaces in engagement as shown in FIGURE 3. Then, by sliding the blanks relative one another along their longitudinal axes to a position as shown in FIGURE 4 a cutter flat 17 is provided without the necessity of grinding. The blanks are then positioned in a chuck 10 and firmly clamped together and the required cutting edge configuration ground thereon. The back of the cutter is then relieved by grinding as shown at 21 in FIGURE 1.

Alternately, the required cutting edge could be ground in one of the blanks prior to the time it is engaged with the other blank and clamped in the chuck.

In addition to eliminating the necessity of grinding flats, the above-described arrangement permits a total of four flats to be obtained from the single pair of blanks. Note that by merely loosening the chuck 10 and sliding the blanks relative one another, the portion labeled 24 in FIGURE 5 can be brought into position for use as a cutter flat. Additionally, by removing the pair of blanks and reinserting their opposite ends two additional cutter flats art obtained. In this manner, a considerable savings both in time and cutter blank cost results.

The invention has been described in great detail sufficient to enable one skilled in the art of cutting to duplicate the invention. Obviously, modifications and alterations of the preferred embodiment described will occur to others upon a reading and understanding of this specification and it is my intention to include all such modifications and alterations as part of my invention insofar as they come within the scope of the appended claims.

Having thus described my invention, I claim:

1. A cutting tool assemblage for use in engraving and duplicating, comprising: a tool holder having a longitudinal axis and adapted to be rotated thereabout, a tool receiving opening formed in one end of said holder, said opening being generally concentric with said axis and provided with means for releasably securing a cutting tool therein; a pair of cutting tool forming blanks positioned in said opening; each of said blanks comprising an elongated hardened body having a longitudinal axis and a flat exterior surface extending parallel to said longitudinal axis; said blanks being positioned in said opening with their flat exterior surfaces in engagement and their longitudinal axes extending parallel to said longitudinal axis of said holder; one of said blanks positioned so as to extend further from said opening, whereby the flat surface of said one blank constitutes a cutting flat.

2. The assemblage recited in claim 1 wherein the body of each of said blanks is of semicylindrical configuration.

3. The assemblage recited in claim 1 wherein the body of each of said blanks is of semi-cylindrical configuration, and wherein said blanks are of equal length.

4. The assemblage recited in claim 1 wherein each of said bodies is formed from carbide.

5. The assemblage recited in claim 1 wherein each of said bodies is of identical semi-cylindrical configuration.

6. The assemblage recited in claim 5 wherein said bodies are of equal length and said flat surfaces are positioned in engagement throughout a substantial portion of said length.

References Cited

UNITED STATES PATENTS

| 1,663,225 | 3/1928 | Widman | 144—219 |
| 2,905,059 | 9/1959 | Fabish | 279—41 X |

FOREIGN PATENTS 933,917  10/1955  Germany.

OTHELL M. SIMPSON, *Primary Examiner.*

R. V. PARKER, Jr., *Assistant Examiner.*